US012024895B2

(12) United States Patent
Yu et al.

(10) Patent No.: US 12,024,895 B2
(45) Date of Patent: Jul. 2, 2024

(54) METHOD AND SYSTEM OF APPLYING A VISCOUS FLUID MATERIAL TO A ROOFING SURFACE

(71) Applicant: BMIC LLC, Dallas, TX (US)

(72) Inventors: Lingtao Yu, Summit, NJ (US); Norman M. Chin, Somerville, NJ (US); Linlin Xing, Wayne, NJ (US); Daniel E. Boss, Morris Township, NJ (US)

(73) Assignee: BMIC LLC, Dallas, TX (US)

( * ) Notice: Subject to any disclaimer, the term of this patent is extended or adjusted under 35 U.S.C. 154(b) by 0 days.

(21) Appl. No.: 18/456,936

(22) Filed: Aug. 28, 2023

(65) Prior Publication Data

US 2023/0407638 A1 Dec. 21, 2023

Related U.S. Application Data

(62) Division of application No. 17/080,939, filed on Oct. 27, 2020, now Pat. No. 11,781,320.

(60) Provisional application No. 62/979,579, filed on Feb. 21, 2020, provisional application No. 62/926,929, filed on Oct. 28, 2019.

(51) Int. Cl.

| | |
|---|---|
| ***E04D 7/00*** | (2006.01) |
| ***B05B 12/08*** | (2006.01) |
| ***B05D 1/02*** | (2006.01) |
| ***B05D 1/12*** | (2006.01) |

(52) U.S. Cl.
CPC .............. *E04D 7/00* (2013.01); *B05B 12/084* (2013.01); *B05B 12/085* (2013.01); *B05D 1/025* (2013.01); *B05D 1/12* (2013.01)

(58) Field of Classification Search
CPC ........................................................ B05D 1/12
See application file for complete search history.

(56) References Cited

U.S. PATENT DOCUMENTS

| | | | | |
|---|---|---|---|---|
| 3,880,228 A * | 4/1975 | Houk | B05B 5/16 | 165/104.31 |
| 3,960,325 A * | 6/1976 | Nienow | B05B 9/0403 | 165/104.31 |
| 4,240,583 A * | 12/1980 | Hughes | B05B 9/06 | 239/588 |
| 8,342,372 B2 | 1/2013 | Choiniere et al. | | |
| 10,604,311 B2 | 3/2020 | Scanish et al. | | |

* cited by examiner

*Primary Examiner* — Nathan T Leong
(74) *Attorney, Agent, or Firm* — Venable LLP

(57) ABSTRACT

This invention relates to a method and system of applying a fluid material to a roofing surface. By modifying a peristaltic pump-driven sprayer device, a fluid material having a viscosity of 10,000 to 40,000 centipoise at 25° C. can be effectively sprayed onto a roofing surface. Additionally, the use of a modified peristaltic pump-driven sprayer device allows for the fluid material to be applied onto the roofing surface at a faster rate than other spraying methods.

9 Claims, 7 Drawing Sheets

METHOD AND SYSTEM OF APPLYING A VISCOUS FLUID MATERIAL TO A ROOFING SURFACE

RELATED APPLICATIONS

This application is a divisional application of U.S. application Ser. No. U.S.S.N. 17/080,939, entitled "Method and System of Applying a Viscous Fluid Material to a Roofing Surface" filed Oct. 27, 2020, which claims the priority of U.S. provisional application Ser. No. U.S.S.N. 62/926,929, entitled "Method of Applying a Viscous Fluid Material to a Roofing Surface" filed Oct. 28, 2019, and U.S. provisional application Ser. No. U.S.S.N. 62/979,579, entitled "Method of Applying a Viscous Fluid Material to a Roofing Surface" filed Feb. 21, 2020, which are incorporated herein by reference in their entirety for all purposes.

FIELD OF THE INVENTION

This invention relates to a method and system of applying a fluid material to a roofing surface. By modifying a peristaltic pump-driven sprayer device, a fluid material having a viscosity of 10,000 to 40,000 centipoise at 25° C. can be effectively sprayed onto a roofing surface. Additionally, the use of a modified peristaltic pump-driven sprayer device allows for the fluid material to be applied onto the roofing surface at a faster rate than other spraying methods.

BACKGROUND OF THE INVENTION

Typically, fluid materials, such as adhesives, are manually applied onto a roofing surface to adhere roofing materials including, but not limited to, roof cover boards or waterproof membranes, to the roof. This manual application of the fluid material can include, for example, the use of a roller device and/or the use of a sprayer-type system (e.g., pressure or pump-driven).

Current roofing sprayers generally use a single pump system to drive a fluid material out of, for example, a spray gun or nozzle. Such roofing sprayers, however, cannot satisfactorily handle a fluid material having a viscosity of 10,000 to 40,000 centipoise at 25° C., are usually expensive in cost, and/or require high maintenance because they are difficult to clean. For example, single, piston pump, airless spray systems have been shown to be unable to satisfactorily handle a fluid material having a viscosity of 10,000 to 30,000 centipoise at 25° C.

There is thus a need for a sprayer-type system configured to apply a fluid material having a viscosity of 10,000 to 40,000 centipoise at 25° C. to a roofing surface that is cost and performance effective, as well as easy to handle and maintain.

SUMMARY OF THE INVENTION

One embodiment of this invention pertains to a method that comprises (a) obtaining a spray application system that is configured to spray a fluid material at a flow rate of 0.5 to 10 gallons per minute, and (b) spraying the fluid material onto a roofing surface using the spray application system. The fluid material has a viscosity of 10,000 to 40,000 centipoise at 25° C. The spray application system includes (i) a peristaltic pump and (ii) an elliptical tip configured to provide a spray pattern of the fluid material onto a roofing surface.

In one embodiment, the fluid material has a viscosity of 10,000 to 30,000 centipoise at 25° C. In one embodiment, the fluid material has a viscosity of 12,000 to 25,000 centipoise at 25° C. In another embodiment, the fluid material has a viscosity of 16,000 to 20,000 centipoise at 25° C. In some embodiments, the fluid material comprises an adhesive solution.

In one embodiment, the peristaltic pump is configured to pump the fluid material onto the roofing surface. In one embodiment, the spray application system further comprises a compressor configured to deliver compressed air to the spray application system, with the compressor being integral to the spray application system.

In some embodiments, the spray pattern comprises a fan spray pattern. In one embodiment, the fluid material comprises a solids content of 30% to 100% after the spraying onto the roofing surface.

In one embodiment, the spray application system further comprises a container configured to store the fluid material. In some embodiments, the container is 5 gallons to 25 gallons. In one embodiment, the container of the spray application system includes a pouch configured to store the fluid material. In one embodiment, the container of the spray application system comprises a pouch-in-a-box system configured to store the fluid material.

In one embodiment, the spray application system further comprises at least one spray nozzle that is connected to the peristaltic pump via a hose, with the at least one spray nozzle being configured to spray the fluid material onto the roofing surface. In another embodiment, the spray application system further comprises at least two spray nozzles that are each connected to the peristaltic pump via a hose, with each of the spray nozzles being configured to spray the fluid material onto the roofing surface.

Another embodiment of this invention pertains to a spray application system that includes a container configured to hold a fluid material, a peristaltic pump configured to pump the fluid material, at least two spray nozzles that are each connected to the peristaltic pump via a hose, with each of the spray nozzles being configured to spray the fluid material onto a roofing surface, and an elliptical tip attached to each of the at least two spray nozzles, with each elliptical tip being configured to provide a spray pattern of the fluid material onto a roofing surface. The spray application system is configured to spray the fluid material at a flow rate of 0.5 to 10 gallons per minute, with the fluid material having a viscosity of 10,000 to 40,000 centipoise at 25° C.

In one embodiment, the spray application system further comprises at least four wheels that are configured to stabilize and to move the spray application system when spraying the fluid material onto a roofing surface.

BRIEF DESCRIPTION OF THE FIGURES

For a more complete understanding of the invention and the advantages thereof, reference is made to the following descriptions, taken in conjunction with the accompanying figures, in which.

DETAILED DESCRIPTION OF THE INVENTION

Figure 1B:
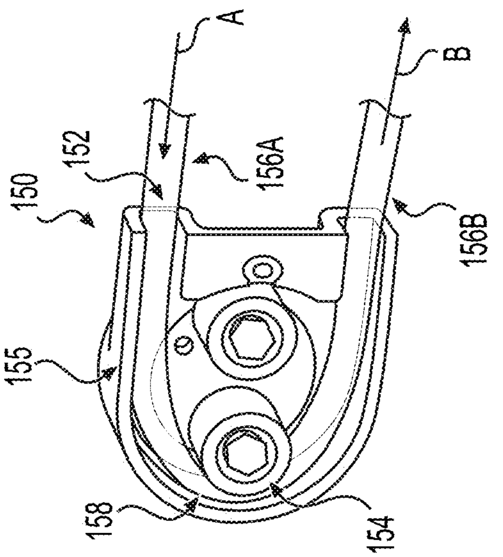
FIG. 1B is an enlarged view of a peristaltic pump that is a component of the peristaltic pump-driven sprayer device shown in FIG. 1A.

One embodiment of this invention pertains to a method that comprises (a) obtaining a spray application system that is configured to spray a fluid material at a flow rate of 0.5 to 10 gallons per minute, and (b) spraying the fluid material onto a roofing surface using the spray application system. The fluid material has a viscosity of 10,000 to 40,000 centipoise at 25° C. The spray application system includes (i) a peristaltic pump and (ii) an elliptical tip configured to provide a spray pattern of the fluid material onto a roofing surface.

In an embodiment, the fluid material has a viscosity of 10,000 to 40,000 centipoise at 25° C. In an embodiment, the fluid material has a viscosity of 12,000 to 40,000 centipoise at 25° C. In an embodiment, the fluid material has a viscosity of 15,000 to 40,000 centipoise at 25° C. In an embodiment, the fluid material has a viscosity of 16,000 to 40,000 centipoise at 25° C. In an embodiment, the fluid material has a viscosity of 18,000 to 40,000 centipoise at 25° C. In an embodiment, the fluid material has a viscosity of 20,000 to 40,000 centipoise at 25° C. In an embodiment, the fluid material has a viscosity of 25,000 to 40,000 centipoise at 25° C. In an embodiment, the fluid material has a viscosity of 30,000 to 40,000 centipoise at 25° C. In an embodiment, the fluid material has a viscosity of 35,000 to 40,000 centipoise at 25° C. In an embodiment, the fluid material has a viscosity of 10,000 to 30,000 centipoise at 25° C. In an embodiment, the fluid material has a viscosity of 12,000 to 30,000 centipoise at 25° C. In an embodiment, the fluid material has a viscosity of 15,000 to 30,000 centipoise at 25° C. In an embodiment, the fluid material has a viscosity of 16,000 to 30,000 centipoise at 25° C. In an embodiment, the fluid material has a viscosity of 18,000 to 30,000 centipoise at 25° C. In an embodiment, the fluid material has a viscosity of 20,000 to 30,000 centipoise at 25° C. In an embodiment, the fluid material has a viscosity of 25,000 to 30,000 centipoise at 25° C. In an embodiment, the fluid material has a viscosity of 10,000 to 25,000 centipoise at 25° C. In an embodiment, the fluid material has a viscosity of 12,000 to 25,000 centipoise at 25° C. In an embodiment, the fluid material has a viscosity of 15,000 to 25,000 centipoise at 25° C. In an embodiment, the fluid material has a viscosity of 16,000 to 25,000 centipoise at 25° C. In an embodiment, the fluid material has a viscosity of 18,000 to 25,000 centipoise at 25° C. In an embodiment, the fluid material has a viscosity of 20,000 to 25,000 centipoise at 25° C. In an embodiment, the fluid material has a viscosity of 10,000 to 20,000 centipoise at 25° C. In an embodiment, the fluid material has a viscosity of 12,000 to 20,000 centipoise at 25° C. In an embodiment, the fluid material has a viscosity of 15,000 to 20,000 centipoise at 25° C. In an embodiment, the fluid material has a viscosity of 16,000 to 20,000 centipoise at 25° C. In an embodiment, the fluid material has a viscosity of 18,000 to 20,000 centipoise at 25° C. In an embodiment, the fluid material has a viscosity of 10,000 to 15,000 centipoise at 25° C. In an embodiment, the fluid material has a viscosity of 12,000 to 15,000 centipoise at 25° C. In one embodiment, the fluid material comprises an adhesive solution.

In an embodiment, the peristaltic pump is configured to pump the fluid material onto the roofing surface. In an embodiment, the spray application system further comprises a compressor configured to deliver compressed air to the spray application system, with the compressor being integral to the spray application system.

In an embodiment, the spray pattern comprises a fan spray pattern. In an embodiment, the fluid material comprises a solids content of 30% to 100% after the spraying onto the roofing surface. In an embodiment, the fluid material comprises a solids content of 40% to 100% after the spraying onto the roofing surface. In an embodiment, the fluid material comprises a solids content of 50% to 100% after the spraying onto the roofing surface. In an embodiment, the fluid material comprises a solids content of 60% to 100% after the spraying onto the roofing surface. In an embodiment, the fluid material comprises a solids content of 70% to 100% after the spraying onto the roofing surface. In an embodiment, the fluid material comprises a solids content of 80% to 100% after the spraying onto the roofing surface. In an embodiment, the fluid material comprises a solids content of 90% to 100% after the spraying onto the roofing surface. In an embodiment, the fluid material comprises a solids content of 30% to 90% after the spraying onto the roofing surface. In an embodiment, the fluid material comprises a solids content of 40% to 90% after the spraying onto the roofing surface. In an embodiment, the fluid material comprises a solids content of 50% to 90% after the spraying onto the roofing surface. In an embodiment, the fluid material comprises a solids content of 60% to 90% after the spraying onto the roofing surface. In an embodiment, the fluid material comprises a solids content of 70% to 90% after the spraying onto the roofing surface. In an embodiment, the fluid material comprises a solids content of 80% to 90% after the spraying onto the roofing surface. In an embodiment, the fluid material comprises a solids content of 30% to 80% after the spraying onto the roofing surface. In an embodiment, the fluid material comprises a solids content of 40% to 80% after the spraying onto the roofing surface. In an embodiment, the fluid material comprises a solids content of 50% to 80% after the spraying onto the roofing surface. In an embodiment, the fluid material comprises a solids content of 60% to 80% after the spraying onto the roofing surface. In an embodiment, the fluid material comprises a solids content of 70% to 80% after the spraying onto the roofing surface. In an embodiment, the fluid material comprises a solids content of 30% to 70% after the spraying onto the roofing surface. In an embodiment, the fluid material comprises a solids content of 40% to 70% after the spraying onto the roofing surface. In an embodiment, the fluid material comprises a solids content of 50% to 70% after the spraying onto the roofing surface. In an embodiment, the fluid material comprises a solids content of 60% to 70% after the spraying onto the roofing surface. In an embodiment, the fluid material comprises a solids content of 30% to 60% after the spraying onto the roofing surface. In an embodiment, the fluid material comprises a solids content of 40% to 60% after the spraying onto the roofing surface. In an embodiment, the fluid material comprises a solids content of 50% to 60% after the spraying onto the roofing surface. In an embodiment, the fluid material comprises a solids content of 30% to 50% after the spraying onto the roofing surface. In an embodiment, the fluid material comprises a solids content of 40% to 50% after the spraying onto the roofing surface. In an embodiment, the fluid material comprises a solids content of 30% to 40% after the spraying onto the roofing surface.

In an embodiment, the spray application system further comprises a container configured to store the fluid material. As noted hereafter, in some embodiments, the container further comprises a pouch and/or a pouch-in-a-box configuration. In an embodiment, the container is 5 gallons to 25 gallons. In an embodiment, the container is 10 gallons to 25 gallons. In an embodiment, the container is 15 gallons to 25 gallons. In an embodiment, the container is 20 gallons to 25 gallons. In an embodiment, the container is 5 gallons to 20 gallons. In an embodiment, the container is 10 gallons to 20 gallons. In an embodiment, the container is 15 gallons to 20 gallons. In an embodiment, the container is 5 gallons to 15 gallons. In an embodiment, the container is 10 gallons to 15 gallons. In an embodiment, the container is 5 gallons to 10 gallons.

As discussed above, the invention relates to a method of spraying a fluid material onto a roofing surface using a spray application system. The fluid material is generally applied onto the roofing surface to adhere a roofing material, such as roof cover boards or waterproof membranes, to the roof. Non-limiting examples of roofing materials include, for example, roof cover board, waterproof membranes, and roof deck such as wood, metal, asphaltic sheets, and concrete roof materials. Non-limiting examples of fluid material includes adhesives. Non-limiting examples of adhesives include, for example, 1K or 2K high solid adhesive such as STP adhesive, Polyurethane adhesive (PU), Poly methyl methacrylate (PMMA), methacrylate adhesive, epoxy adhesive, acrylate adhesive; water based adhesives such as acrylic, polyvinyl acetate, ethylene vinyl acetate; solvent based adhesives such as neoprene adhesive, styrene butadiene styrene (SBS), polyurethane (PU), acrylic, polyolefin; and combinations thereof.

According to an embodiment of the invention, a fluid material having a viscosity range as described herein is applied to a roofing surface using a spray application system. FIG. 1A shows a spray application system 100 according to an embodiment of the invention. In this embodiment, the spray application system 100 includes a container 110 configured to hold the fluid material, a compressor 120 configured (i) to deliver compressed air to the spray application system 100 and (ii) to provide power to pump the fluid material through the spray application system 100, a spray gun or nozzle 130 configured to spray the fluid material out of the spray application system 100, a hose or tube 140 configured to deliver the fluid material from the container 110 to the spray gun 130, and an air tube 142 configured to deliver compressed air from the compressor 120 to the spray gun 130. As shown in the embodiment of FIG. 1A, the hose or tube 140 is connected to the system 100 via an outlet 148 and the air tube 142 is connected to the compressor 120 via an air outlet 141. According to one embodiment, the container 110 can further include a liner (not shown) and/or pouch (see FIG. 4A) configured to protect the container 110 from the fluid material and to allow for ease in cleaning the container 110. According to the embodiment of FIG. 1A, the spray application system 100 further includes a movable cart 112 configured to hold the container 110 and the compressor 120. The movable cart 112 includes (i) a pair of wheels (only wheel 125 is shown in the embodiment of FIG. 1A) on one side (i.e., the back side) of the movable cart 112, and (ii) a front portion 122 that includes a single wheel 124 on an opposite side of the movable cart 112 that is at the front of the device 100, which allows for steering the device 100 during use. Thus, according to the embodiment of FIG. 1A, the movable cart 112 includes at least three (3) wheels for stabilizing and moving the device 100. The movable cart 112 can further include a pair of handles 115 that allows for a user to easily move the spray application system 100 during use. According to this embodiment, the spray application system 100 includes a peristaltic pump 150 configured to deliver the fluid material from the container 110 via an inlet 160 and the peristaltic pump 150 into the hose or tube 140 and out of the spray gun 130 via the outlet 148.

Figure 1A:
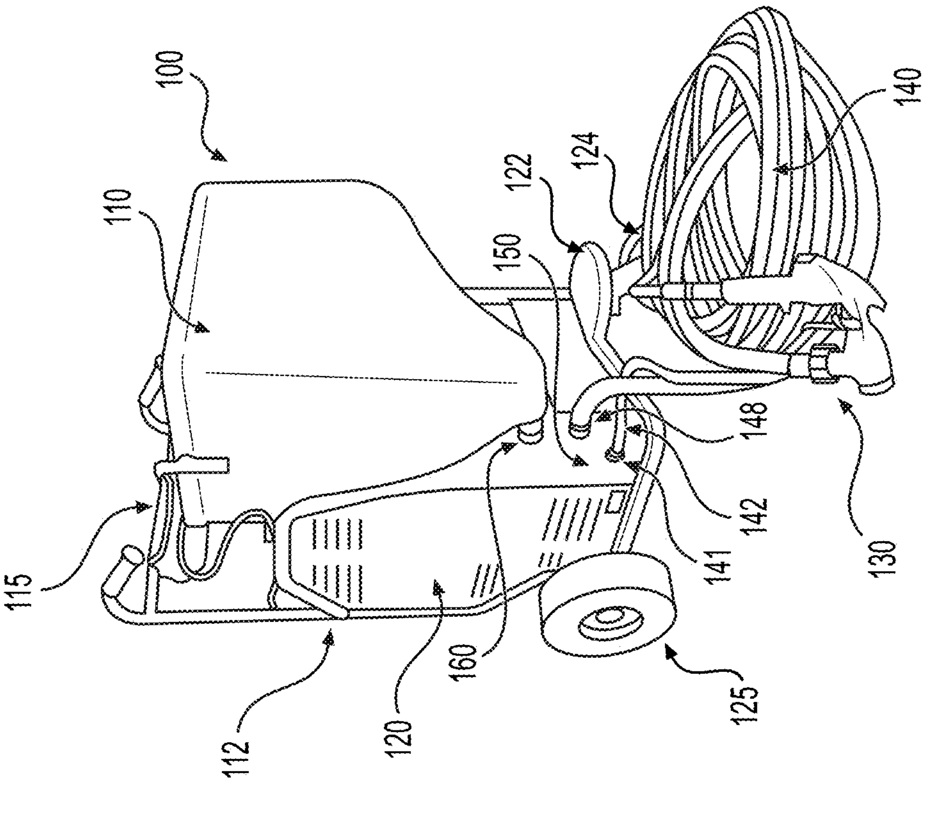
FIG. 1A is an illustration of a peristaltic pump-driven sprayer device for use in an embodiment of the invention.

FIG. 1B illustrates an embodiment of a peristaltic pump 150 for use in a spray application system 100 of the embodiment of FIG. 1A. In this embodiment, the peristaltic pump 150 includes a flexible tube 152 that is disposed within a pump casing 155, as well as a rotating roller 154. The pump casing 155 and rotating roller 154 are configured such that the flexible tube 152 is disposed inside of the pump casing 155 and around at least a portion of the rotating roller 154. The fluid material (i) enters the flexible tube 152 on a suction side 156A of the peristaltic pump 150, in the direction labeled as A in FIG. 1B, and (ii) exits the flexible tube 152 on a discharge side 156B of the peristaltic pump 150, in the direction labeled as B in FIG. 1B. As the rotating roller 154 rotates, the rotating roller 154 passes along a length of the flexible tube 152, which creates a temporary seal in a portion 158 of the peristaltic pump 150 between the suction side 156A and the discharge side 156B of the peristaltic pump 150. As a rotor (not shown) of the peristaltic pump 150 turns the rotating roller 154, a sealing pressure moves along the flexible tube 152, forcing the fluid material to move away from the suction side 156A of the peristaltic pump 150 and into the discharge side 156B of the peristaltic pump 150. On the suction side 156A of the peristaltic pump 150, the pressure is released, and the flexible tube 152 recovers, thus, creating a vacuum, which draws the fluid material into the suction side 156A of the peristaltic pump 150 (e.g., the priming mechanism). Thereafter, as discussed above, the rotating roller 154 moves the sealing pressure along the flexible tube 152, forcing the fluid material to move away from the suction side 156A of the peristaltic pump 150 and into the discharge side 156B of the peristaltic pump 150. Accordingly, the pumping principle of the peristaltic pump 150, known as peristalsis, is based on alternating compression and relaxation of the flexible tube 152, which draws the fluid material into the peristaltic pump 150 (i.e., in the direction labeled as A in FIG. 1B) and propels the fluid material away from the peristaltic pump 150 (i.e., in the direction labeled as B in FIG. 1B).

According to one embodiment, the spray application system 100 with peristaltic pump 150 of FIGS. 1A and 1B can be the MARSHALLTOWN© Sprayer sold under the name DUOTEX™ Drywall Texture Sprayer by Marshalltown Company of Marshalltown, Iowa.

According to one embodiment, the spray application system 100 utilizes a hose or tube (e.g., tube 140 of FIG. 1A) that is configured to deliver the fluid material from a container (e.g., container 110 of FIG. 1A) to a spray gun or nozzle (e.g., spray gun 130 of FIG. 1A). In one embodiment, the hose or tube (e.g., tube 140 of FIG. 1A) is a 1-inch diameter hose that is from 25 feet to 100 feet long.

According to one embodiment, the spray application system 100 is configured to spray a fluid material at a flow rate of 0.5 to 10 gallons per minute. According to one embodiment, the spray application system 100 is configured to spray a fluid material at a flow rate of 0.5 to 9 gallons per minute. According to one embodiment, the spray application system 100 is configured to spray a fluid material at a flow rate of 0.5 to 8 gallons per minute. According to one embodiment, the spray application system 100 is configured to spray a fluid material at a flow rate of 0.5 to 7 gallons per minute. According to one embodiment, the spray application system 100 is configured to spray a fluid material at a flow rate of 0.5 to 6 gallons per minute. According to one embodiment, the spray application system 100 is configured to spray a fluid material at a flow rate of 0.5 to 5 gallons per minute. According to one embodiment, the spray application system 100 is configured to spray a fluid material at a flow rate of 0.5 to 4 gallons per minute. According to one embodiment, the spray application system 100 is configured to spray a fluid material at a flow rate of 0.5 to 3 gallons per minute. According to one embodiment, the spray application system 100 is configured to spray a fluid material at a flow rate of 0.5 to 2 gallons per minute. According to one embodiment, the spray application system 100 is configured to spray a fluid material at a flow rate of 0.5 to 1 gallon per minute. According to one embodiment, the spray application system 100 is configured to spray a fluid material at a flow rate of 1 to 10 gallons per minute. According to one embodiment, the spray application system 100 is configured to spray a fluid material at a flow rate of 1 to 9 gallons per minute. According to one embodiment, the spray application system 100 is configured to spray a fluid material at a flow rate of 1 to 8 gallons per minute. According to one embodiment, the spray application system 100 is configured to spray a fluid material at a flow rate of 1 to 7 gallons per minute. According to one embodiment, the spray application system 100 is configured to spray a fluid material at a flow rate of 1 to 6 gallons per minute. According to one embodiment, the spray application system 100 is configured to spray a fluid material at a flow rate of 1 to 5 gallons per minute. According to one embodiment, the spray application system 100 is configured to spray a fluid material at a flow rate of 1 to 4 gallons per minute. According to one embodiment, the spray application system 100 is configured to spray a fluid material at a flow rate of 1 to 3 gallons per minute. According to one embodiment, the spray application system 100 is configured to spray a fluid material at a flow rate of 1 to 2 gallons per minute. According to one embodiment, the spray application system 100 is configured to spray a fluid material at a flow rate of 2 to 10 gallons per minute. According to one embodiment, the spray application system 100 is configured to spray a fluid material at a flow rate of 2 to 9 gallons per minute. According to one embodiment, the spray application system 100 is configured to spray a fluid material at a flow rate of 2 to 8 gallons per minute. According to one embodiment, the spray application system 100 is configured to spray a fluid material at a flow rate of 2 to 7 gallons per minute. According to one embodiment, the spray application system 100 is configured to spray a fluid material at a flow rate of 2 to 6 gallons per minute. According to one embodiment, the spray application system 100 is configured to spray a fluid material at a flow rate of 2 to 5 gallons per minute. According to one embodiment, the spray application system 100 is configured to spray a fluid material at a flow rate of 2 to 4 gallons per minute. According to one embodiment, the spray application system 100 is configured to spray a fluid material at a flow rate of 2 to 3 gallons per minute. According to one embodiment, the spray application system 100 is configured to spray a fluid material at a flow rate of 3 to 10 gallons per minute. According to one embodiment, the spray application system 100 is configured to spray a fluid material at a flow rate of 3 to 9 gallons per minute. According to one embodiment, the spray application system 100 is configured to spray a fluid material at a flow rate of 3 to 8 gallons per minute. According to one embodiment, the spray application system 100 is configured to spray a fluid material at a flow rate of 3 to 7 gallons per minute. According to one embodiment, the spray application system 100 is configured to spray a fluid material at a flow rate of 3 to 6 gallons per minute. According to one embodiment, the spray application system 100 is configured to spray a fluid material at a flow rate of 3 to 5 gallons per minute. According to one embodiment, the spray application system 100 is configured to spray a fluid material at a flow rate of 3 to 4 gallons per minute. According to one embodiment, the spray application system 100 is configured to spray a fluid material at a flow rate of 4 to 10 gallons per minute. According to one embodiment, the spray application system 100 is configured to spray a fluid material at a flow rate of 4 to 9 gallons per minute. According to one embodiment, the spray application system 100 is configured to spray a fluid material at a flow rate of 4 to 8 gallons per minute. According to one embodiment, the spray application system 100 is configured to spray a fluid material at a flow rate of 4 to 7 gallons per minute. According to one embodiment, the spray application system 100 is configured to spray a fluid material at a flow rate of 4 to 6 gallons per minute. According to one embodiment, the spray application system 100 is configured to spray a fluid material at a flow rate of 4 to 5 gallons per minute. According to one embodiment, the spray application system 100 is configured to spray a fluid material at a flow rate of 5 to 10 gallons per minute. According to one embodiment, the spray application system 100 is configured to spray a fluid material at a flow rate of 5 to 9 gallons per minute. According to one embodiment, the spray application system 100 is configured to spray a fluid material at a flow rate of 5 to 8 gallons per minute. According to one embodiment, the spray application system 100 is configured to spray a fluid material at a flow rate of 5 to 7 gallons per minute. According to one embodiment, the spray application system 100 is configured to spray a fluid material at a flow rate of 5 to 6 gallons per minute. According to one embodiment, the spray application system 100 is configured to spray a fluid material at a flow rate of 6 to 10 gallons per minute. According to one embodiment, the spray application system 100 is configured to spray a fluid material at a flow rate of 6 to 9 gallons per minute. According to one embodiment, the spray application system 100 is configured to spray a fluid material at a flow rate of 6 to 8 gallons per minute. According to one embodiment, the spray application system 100 is configured to spray a fluid material at a flow rate of 6 to 7 gallons per minute. According to one embodiment, the spray application system 100 is configured to spray a fluid material at a flow rate of 7 to 10 gallons per minute. According to one embodiment, the spray application system 100 is configured to spray a fluid material at a flow rate of 7 to 9 gallons per minute. According to one embodiment, the spray application system 100 is configured to spray a fluid material at a flow rate of 7 to 8 gallons per minute. According to one embodiment, the spray application system 100 is configured to spray a fluid material at a flow rate of 8 to 10 gallons per minute. According to one embodiment, the spray application system 100 is configured to spray a fluid material at a flow rate of 8 to 9 gallons per minute. According to one embodiment, the spray application system 100 is configured to spray a fluid material at a flow rate of 9 to 10 gallons per minute. According to one embodiment, the spray application system 100 is configured to spray a fluid material at a flow rate of 2.6 gallons per minute.

Figure 2A:
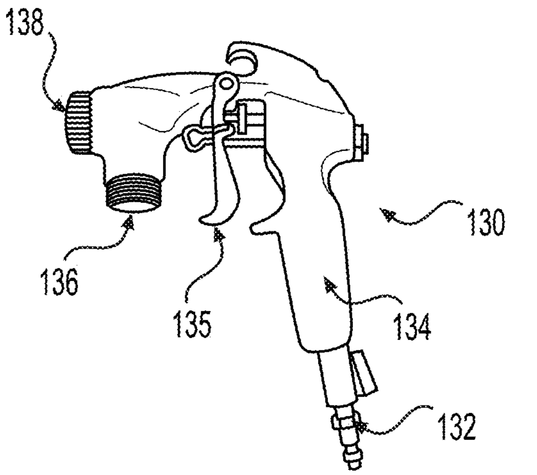
FIG. 2A is an illustration of a spray gun that is a component of the peristaltic pump-driven sprayer device shown in FIG. 1A.

FIG. 2A illustrates a spray gun 130 according to one embodiment of the invention. The spray gun 130 of the embodiment of FIG. 2A is a component of the spray application system 100 shown in FIG. 1A. In this embodiment, the spray gun 130 includes a connector 132 configured to connect to an air tube (e.g., air tube 142 of FIG. 1A) that is configured to deliver compressed air from a compressor (e.g., compressor 120 of FIG. 1A) to the spray gun 130 for spraying the fluid material out of the spray gun 130. The spray gun 130 of the embodiment of FIG. 2A further includes a handle 134 configured to allow for a user to hold the spray gun 130, a trigger 135 configured to allow for a user to spray the fluid material out of the spray gun 130, and an outlet 138 configured to spray the fluid material out of the spray gun 130. In this embodiment, the spray gun 130 also includes an inlet 136 configured to connect to a tube or hose (e.g., tube 140 of FIG. 1A) that is configured to deliver the fluid material from a container (e.g., container 110 of FIG. 1A) to the spray gun 130. In this embodiment, the outlet 138 will further include a spray tip, such as the spray tips shown in FIGS. 2B and 2C, as discussed in more detail below.

Figure 2B:
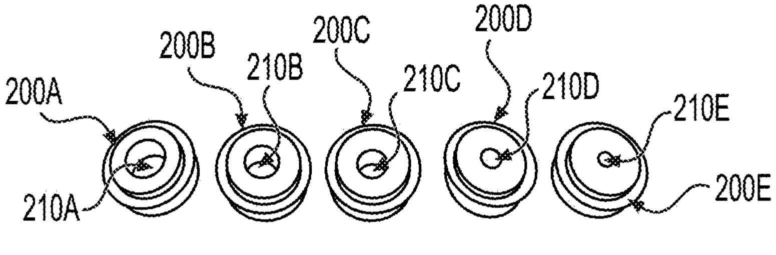
FIG. 2B is an illustration of the typical spray tips that are used with the spray gun shown in FIG. 2A.

FIG. 2B illustrates spray tips 200A-200E with openings 210A-210E having various respective circular configurations. The spray tips 200A-200E of FIG. 2B are each configured to attach to the outlet 138 of the spray gun 130 shown in the embodiment of FIG. 2A. The respective openings 210A-210E of the spray tips 200A-200E of FIG. 2B are configured to provide a certain spray pattern of the fluid material as the fluid material is sprayed out of the spray gun 130. The respective openings 210A-210E of the spray tips 200A-200E of FIG. 2B, however, did not provide a certain spray pattern that is necessary and/or desirable to effectively apply a fluid material to a roofing surface.

Figure 2C:
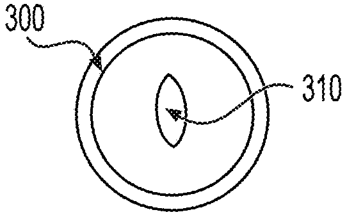
FIG. 2C is an illustration of a modified spray tip in accordance with an embodiment of the invention that is used with the spray gun shown in FIG. 2A.
Figure 3A:
FIG. 3A is a photograph illustrating the application of a fluid material having a viscosity of 15,000 centipoise at 25° C. to a roofing surface according to an embodiment of the invention.
Figure 3B:
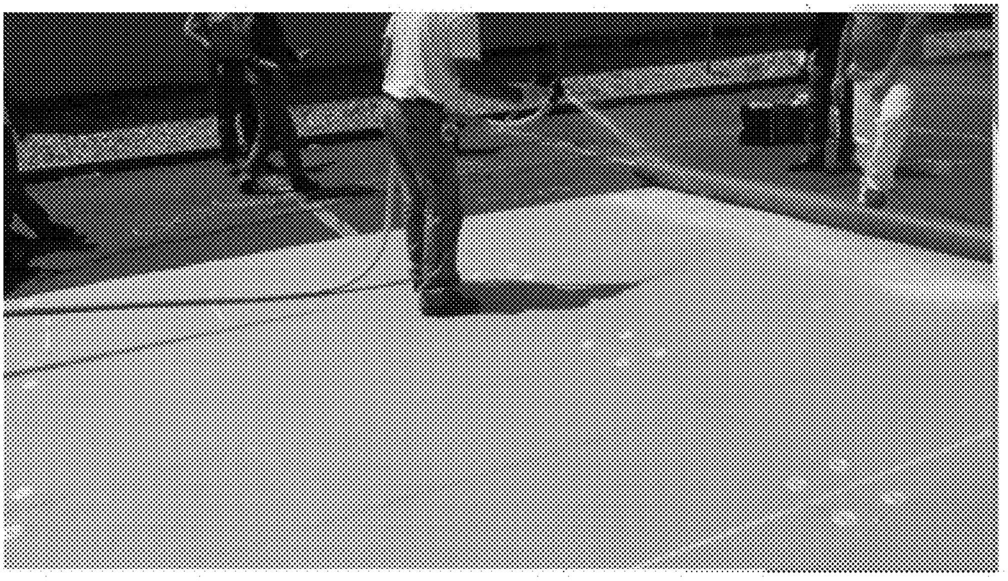
FIG. 3B is a photograph illustrating the application of a viscous fluid material having a viscosity of 15,000 centipoise at 25° C. to a roofing surface according to an embodiment of the invention.

According to one embodiment, a spray tip was modified into an elliptical shape to remedy the deficiencies of the spray patterns of the spray tips 200A-200E of FIG. 2B. FIG. 2C illustrates an embodiment of a modified spray tip 300 having an opening 310 of an elliptical shape. In this embodiment, the opening 310 of the spray tip 300 having an elliptical shape was configured to provide a fan spray pattern (FIG. 3B) in contrast to the circular spray pattern (FIG. 3A) generated by the openings 210A-210E of the spray tips 200A-200E of FIG. 2B. This fan spray pattern is necessary and/or desirable to effectively apply a fluid material to a roofing surface.

According to one embodiment, the use of a spray application system with a peristaltic pump (such as, e.g., the system and pump shown in FIGS. 1A and 1B) to apply a fluid material to a roofing surface was found to be able to apply the fluid material at least two (2) times faster than traditional application methods and up to fifteen (15) times faster than traditional application methods. According to one embodiment, the use of a spray application system with a peristaltic pump (such as, e.g., the system and pump shown in FIGS. 1A and 1B) to apply a fluid material to a roofing surface was found to be able to apply the fluid material at least two and one-half (2.5) times faster than traditional methods and up to fifteen (15) times faster than traditional application methods. According to one embodiment, the use of a spray application system with a peristaltic pump (such as, e.g., the system and pump shown in FIGS. 1A and 1B) to apply a fluid material to a roofing surface was found to be able to apply the fluid material at least three (3) times faster than traditional methods and up to fifteen (15) times faster than traditional application methods. According to one embodiment, the use of a spray application system with a peristaltic pump (such as, e.g., the system and pump shown in FIGS. 1A and 1B) to apply a fluid material to a roofing surface was found to be able to apply the fluid material at least five (5) times faster than traditional methods and up to fifteen (15) times faster than traditional application methods. According to one embodiment, the use of a spray application system with a peristaltic pump (such as, e.g., the system and pump shown in FIGS. 1A and 1B) to apply a fluid material to a roofing surface was found to be able to apply the fluid material at least ten (10) times faster than traditional methods and up to fifteen (15) times faster than traditional application methods. According to one embodiment, the use of a spray application system with a peristaltic pump (such as, e.g., the system and pump shown in FIGS. 1A and 1B) to apply a fluid material to a roofing surface was found to be able to apply the fluid material at least two (2) times faster than traditional methods and up to ten (10) times faster than traditional application methods. According to one embodiment, the use of a spray application system with a peristaltic pump (such as, e.g., the system and pump shown in FIGS. 1A and 1B) to apply a fluid material to a roofing surface was found to be able to apply the fluid material at least two and one-half (2.5) times faster than traditional methods and up to ten (10) times faster than traditional application methods. According to one embodiment, the use of a spray application system with a peristaltic pump (such as, e.g., the system and pump shown in FIGS. 1A and 1B) to apply a fluid material to a roofing surface was found to be able to apply the fluid material at least three (3) times faster than traditional methods and up to ten (10) times faster than traditional application methods. According to one embodiment, the use of a spray application system with a peristaltic pump (such as, e.g., the system and pump shown in FIGS. 1A and 1B) to apply a fluid material to a roofing surface was found to be able to apply the fluid material at least five (5) times faster than traditional methods and up to ten (10) times faster than traditional application methods. According to one embodiment, the use of a spray application system with a peristaltic pump (such as, e.g., the system and pump shown in FIGS. 1A and 1B) to apply a fluid material to a roofing surface was found to be able to apply the fluid material at least two (2) times faster than traditional methods and up to five (5) times faster than traditional application methods. According to one embodiment, the use of a spray application system with a peristaltic pump (such as, e.g., the system and pump shown in FIGS. 1A and 1B) to apply a fluid material to a roofing surface was found to be able to apply the fluid material at least two and one-half (2.5) times faster than traditional methods and up to five (5) times faster than traditional application methods. According to one embodiment, the use of a spray application system with a peristaltic pump (such as, e.g., the system and pump shown in FIGS. 1A and 1B) to apply a fluid material to a roofing surface was found to be able to apply the fluid material at least three (3) times faster than traditional methods and up to five (5) times faster than traditional application methods.

According to one embodiment, the use of a spray application system with a peristaltic pump (such as the system and pump shown in FIGS. 1A and 1B) to apply a fluid material to a roofing surface was found to be able to apply the fluid material at a solids content of up to 100%. According to this embodiment, by spraying a fluid material having a 100% solids content, no wait time was needed for volatiles and/or solvents to evaporate.

Figure 4A:
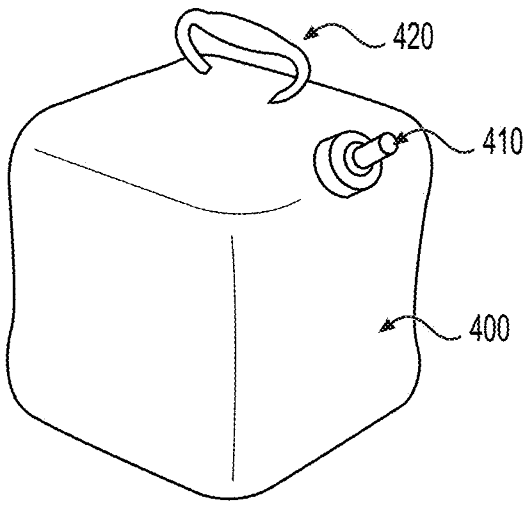
FIG. 4A is an illustration of a pouch for holding a viscous fluid material according to an embodiment of the invention.

According to one embodiment, the fluid material can be provided within a liner and/or pouch, as discussed above. FIG. 4A illustrates an embodiment of a pouch 400 for holding the fluid material. According to one embodiment, the pouch 400 is an air-tight pouch. The pouch 400 includes a spout 410 configured to release the fluid material, as well as a handle 420 for ease in carrying the pouch 400. According to one embodiment, the pouch 400 is provided within the container 110 of the spray application system 100 of FIG. 1A, such that the pouch 400 can protect the container 110 from the fluid material and allow for ease in cleaning the container 110. The spout 410 of the pouch 400 can be connected to the hose or tube 140 of the spray application system 100 in order to deliver the fluid material from the pouch 400 to the spray gun 130.

Figure 4B:
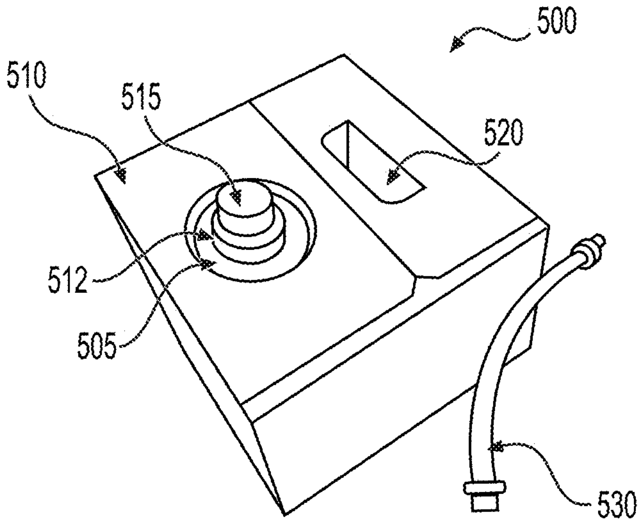
FIG. 4B is an illustration of a pouch-in-a-box system for holding a viscous fluid material according to an embodiment of the invention.

FIG. 4B illustrates another embodiment of a pouch for holding the fluid material. According to this embodiment, the fluid material can be provided within a pouch 505 that is contained within a box 510 (i.e., a pouch-in-a-box system 500). According to one embodiment, the pouch 505 is an air-tight pouch. The pouch 505 includes a spout 512 configured to release the fluid material. In the embodiment of FIG. 4B, the spout 512 is covered by a cap 515. According to one embodiment, the spout 512 can be connected to a tube or hose 530 configured to deliver the fluid material from the pouch-in-a-box system 500. In the embodiment of FIG. 4B, the box 510 can also include a handle 520 for ease in carrying the pouch-in-a-box system 500. In one embodiment, the box 510 can be disposed within the container 110 of the spray application system 100 of FIG. 1A, such that the box 510 can protect the container 110 from the fluid material and allow for ease in cleaning the container 110. The spout 512 of the pouch 505 can be connected (with or without the tube 530) to the hose or tube 140 of the spray application system 100 in order to deliver the fluid material from the pouch-in-a-box system 500 to the spray gun 130. In another embodiment, the pouch-in-a-box system 500 can replace the container 110 of FIG. 1A and thus, the pouch-in-a-box system 500 can be directly connected to the hose or tube 140 of the spray application system 100 (see, e.g., FIG. 5B).

According to one embodiment, either the pouch 400 of FIG. 4A or the pouch-in-a-box system 500 of FIG. 4B saves time and/or cost in handling the fluid material in the field and/or cleaning the spray application system after applying the fluid material to a roofing surface. According to one embodiment, either the pouch 400 of FIG. 4A or the pouch-in-a-box system 500 of FIG. 4B saves cost overall, as compared to, for example, a plastic pail for holding the fluid material.

According to one embodiment, either the pouch 400 of FIG. 4A or the pouch-in-a-box system 500 of FIG. 4B provides an air-tight pouch such that the fluid material is not exposed to air and/or moisture when spraying the fluid material onto a roofing surface. By preventing the fluid material from being exposed to air and/or moisture, curing or skinning of the fluid material within the spray application system can also be prevented, and, thus, clogging of the spray application system with cured fluid material, including, e.g., clogging of the hose or tube 140 and/or the spray gun 130 is further prevented.

Figure 5A:
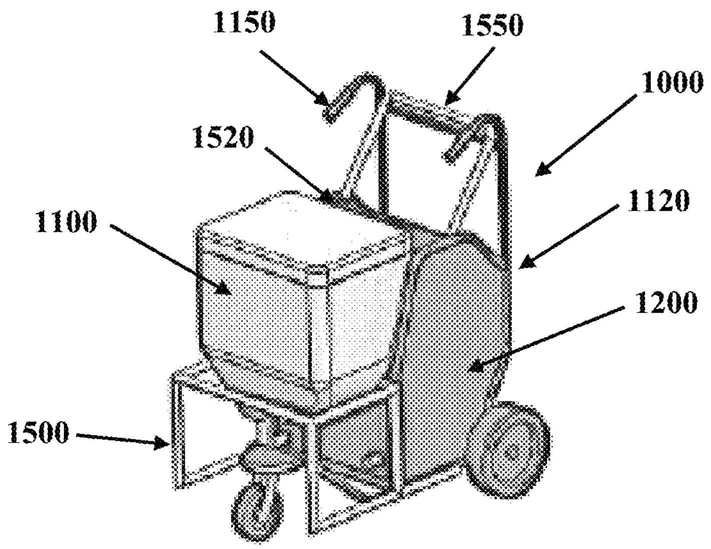
FIG. 5A is an illustration of a cart with a shelving system for supporting a container according to an embodiment of the invention.

According to one embodiment, the movable cart (e.g., cart 112 of FIG. 1A) of the spray application system can be modified to include a shelving system for supporting a hopper or container and/or a pouch-in-a-box system (see, e.g., system 500 of FIG. 4B) that holds the fluid material. FIG. 5A illustrates an embodiment of a spray application system 1000 that includes a compressor 1200 and a movable cart 1120 that is configured to hold the compressor 1200. Attached to the movable cart 1120 is a shelving system that comprises a lower shelf unit 1500 and an upper shelf unit 1550. In the embodiment of FIG. 5A, the lower shelf unit 1500 is configured to support a container or hopper 1100, which holds a fluid material for spraying onto a roofing surface. In an embodiment, the fluid material is further contained within a pouch (e.g., pouch 400 of FIG. 4A) that is disposed within the hopper or container 1100. In the embodiment of FIG. 5A, the upper shelf unit 1550 is placed in an upright position as this unit 1550 is not being used according to this embodiment. According to one embodiment, the lower shelf unit 1500 is permanently attached to the movable cart 1120 and easily fits around the container or hopper 1100. According to one embodiment, the upper shelf unit 1550 is attached via a rotating weldment 1520 to allow for support of additional containers and/or pouch-in-a-box systems (see, e.g., system 500 of FIG. 4B) once the upper shelf unit 1550 is rotated into position via the rotating weldment 1520, which will be further described below. The movable cart 1120 of FIG. 5A further includes a pair of handles 1150 that allows for a user to easily move the spray application system 1000 during use.

Figure 5B:
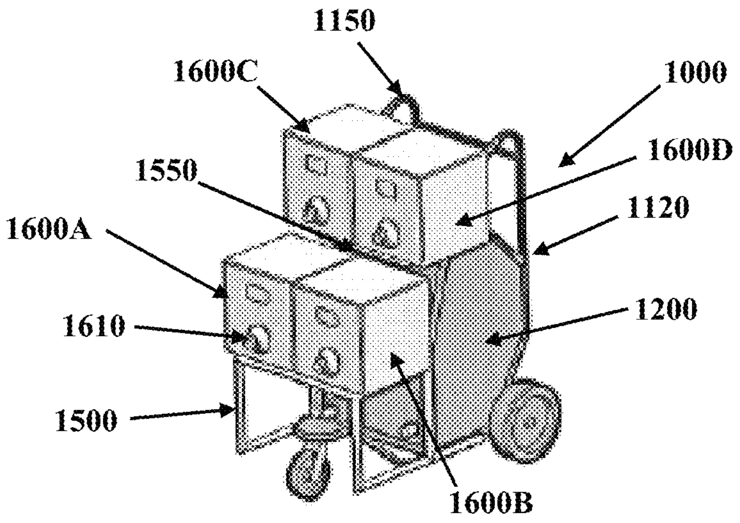
FIG. 5B is an illustration of a cart with a shelving system for supporting a plurality of containers according to an embodiment of the invention.

FIG. 5B illustrates another embodiment of the spray application system 1000 of FIG. 5A in which a plurality of containers (1600A-1600D), e.g., pouch-in-a-box systems 500 of FIG. 4B, are being supported. In this embodiment, the lower shelf unit 1500 is configured to support at least two containers 1600A and 1600B, while the upper shelf unit 1550 is placed in a downward position (via the rotating weldment 1520) in order to support at least two additional containers 1600C and 1600D. According to one embodiment, each of the containers 1600A-1600D comprises the pouch-in-a-box system 500 of FIG. 4B. In the embodiment of FIG. 5B, each of the containers 1600A-1600D includes a spout 1610 (see also, e.g., spout 512 of FIG. 4B) that is configured to release a fluid material that is being contained within each of the containers 1600A-1600D. According to one embodiment, as discussed above, the respective spout 1610 of the container (e.g., container 1600A) is directly connected to a hose or tube (see, e.g., hose or tube 140 of the spray application system 100 of FIG. 1A) when the fluid material of that container is being sprayed onto a roofing surface. According to the embodiment of FIG. 5B, each of the containers 1600A-1600D can be used during the spraying of the fluid material onto a roofing surface, which allows for multiple containers to be used during the spraying of the fluid material, and, thus, saves time by avoiding the need to replace empty pouches or containers during the spraying of the fluid material.

Figure 6B:
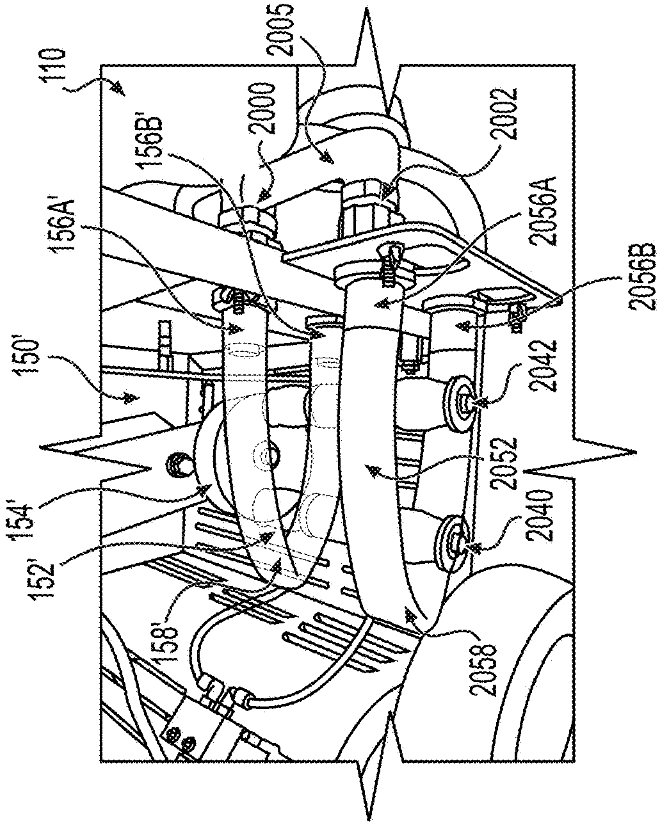
FIG. 6B is an enlarged, sectional side view of the modified peristaltic pump-driven sprayer device of FIG. 6A that shows the modifications to the peristaltic pump according to an embodiment of the invention.
Figure 6A:
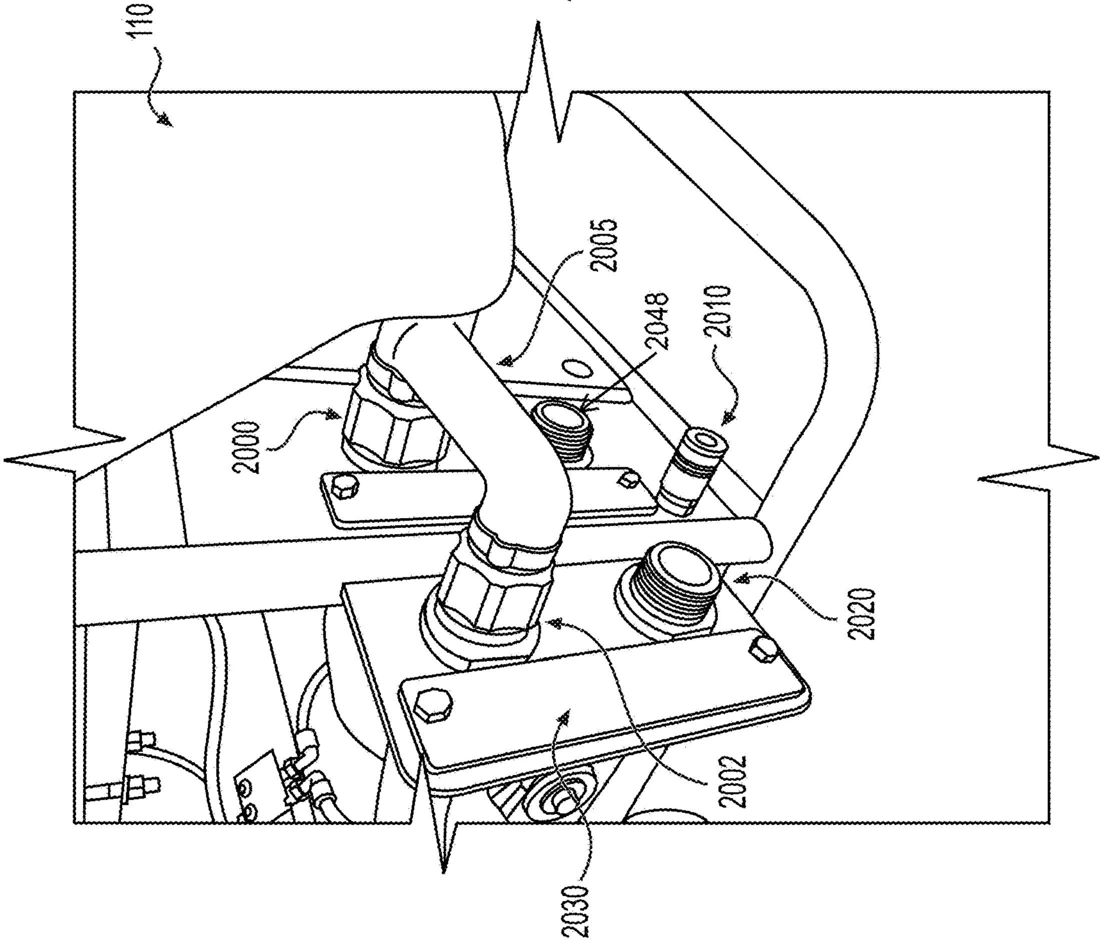
FIG. 6A is an enlarged, sectional view of the peristaltic pump-driven sprayer device of FIG. 1A that has been modified to include at least two spray nozzles according to an embodiment of the invention.

FIG. 6A illustrates a modification to the spray application system 100 of FIG. 1A according to an embodiment of the invention. In this embodiment, the spray application system includes the container 110 configured to hold the fluid material. The container 110 is connected to a first inlet 2000 (similar to inlet 160 of FIG. 1A) to deliver the fluid material through a first hose or tube (see, e.g., hose or tube 140 of FIG. 1A) via a peristaltic pump (see, e.g., pump 150' of FIG. 6B) to a first spray gun or nozzle (see, e.g., spray gun 130 of FIG. 1A) via a first outlet 2048 (similar to outlet 148 of FIG. 1A). The container 110 is further connected to a second inlet 2002 through a connector 2005, such that the container 110 can further deliver the fluid material through a second hose or tube (see, e.g., hose or tube 2052 of FIG. 6B) via the peristaltic pump (see, e.g., pump 150' of FIG. 6B) to a second spray gun or nozzle via a second outlet 2020. According to the embodiment of FIG. 6A, the second inlet 2002 and the second outlet 2020 are attached to the spray application system using a panel 2030, that supports the second inlet 2002 and the second outlet 2020. By modifying the spray application system of FIG. 1A to be able to connect to at least two spray guns or nozzles, at least two workers or operators can apply fluid material from the container 110 to a roofing surface using the same system simultaneously. The spray application system of FIG. 6A also includes an air outlet 2010 (similar to air outlet 141 of FIG. 1A) that connects to an air tube (see, e.g., air tube 142 of FIG. 1A) that is configured to deliver compressed air from a compressor (see, e.g., compressor 120 of FIG. 1A) to both the first and second spray guns or nozzles. According to this embodiment, the spray application system further includes a modified peristaltic pump (see, e.g., pump 150' of FIG. 6B) configured to deliver the fluid material from the container 110 into the first and second hoses or tubes (see, e.g., first hose 152' and second hose 2052 of FIG. 6B) and out of the respective spray guns or nozzles.

FIG. 6B illustrates an embodiment of a peristaltic pump 150' for use in the modified spray application system of the embodiment of FIG. 6A. In this embodiment, the peristaltic pump 150' includes (i) a first hose or tube 152' that connects to the container 110 via the first inlet 2000, (ii) a second hose or tube 2052 that connects to the container 110 via the second outlet 2002 and the connector 2005, and (iii) a rotating roller 154' that is attached to extension members 2040 and 2042. The first tube 152' and the second tube 2052 are each disposed around the extension members 2040 and 2042, so that the rotating roller 154' can interact with the first tube 152' and the second tube 2052. In this regard, fluid material (i) enters the first tube 152' and the second tube 2052 on a suction side 156A' and 2056A of the peristaltic pump 150', and (ii) exits the first tube 152' and the second tube 2052 on a discharge side 156B' and 2056B of the peristaltic pump 150'. As the rotating roller 154' rotates, which in turn rotates the extension members 2040 and 2042, the rotating roller 154' and the extension members 2040 and 2042 passes along a length of the first tube 152' and a length of the second tube 2052, which (i) creates a temporary seal in a portion 158' of the first tube 152' between the suction side 156A' and the discharge side 156B' and (ii) creates a temporary seal in a portion 2058 of the second tube 2052 between the suction side 2056A and the discharge side 2056B. As a rotor (not shown) of the peristaltic pump 150' turns the rotating roller 154', which in turn rotates the extension members 2040 and 2042, a sealing pressure moves along the first tube 152' and the second tube 2052, forcing the fluid material to move away from the suction side 156A' and 2056A of the peristaltic pump 150' and into the discharge side 156B' and 2056B of the peristaltic pump 150'. On the suction side 156A' and 2056A of the peristaltic pump 150', the pressure is released, and the first tube 152' and the second tube 2052 recover, thus, creating a vacuum, which draws the fluid material into the suction side 156A' and 2056A of the peristaltic pump 150' (e.g., the priming mechanism). Thereafter, as discussed above, the rotating roller 154' moves the sealing pressure along the first tube 152' and the second tube 2052, forcing the fluid material to move away from the suction side 156A' and 2056A of the peristaltic pump 150' and into the discharge side 156B' and 2056B of the peristaltic pump 150'. Accordingly, as discussed above, the pumping principle of the peristaltic pump 150', known as peristalsis, draws the fluid material into the peristaltic pump 150' and propels the fluid material away from the peristaltic pump 150'.

Figure 7:
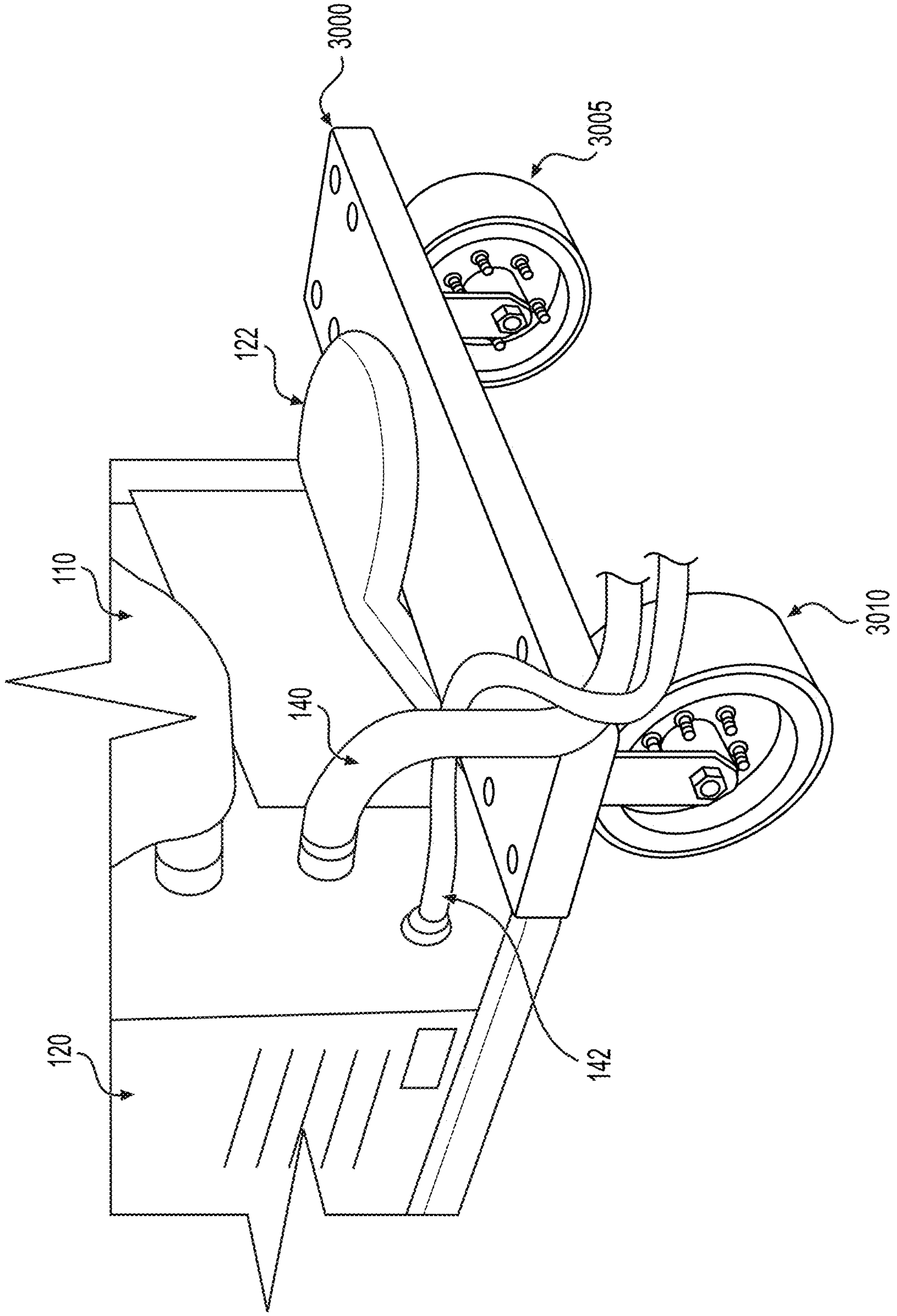
FIG. 7 is an enlarged, sectional view of the peristaltic pump-driven sprayer device of FIG. 1A that has been modified to include two wheels in the front of the device according to an embodiment of the invention.

FIG. 7 illustrates another modification to the spray application system 100 of FIG. 1A according to an embodiment of the invention. In this embodiment, the front portion 122 of the spray application system is modified to include a stabilizing bar 3000 that connects at least two wheels 3005 and 3010 to the system. Thus, according to the embodiment of FIG. 7, the spray application system can include at least four (4) wheels to stabilize and to move the spray application system when spraying a fluid material onto a roofing surface.

Specific embodiments of the invention will now be demonstrated by reference to the following examples. It should be understood that these examples are disclosed by way of illustrating the invention and should not be taken in any way to limit the scope of the present invention.

EXAMPLES

Example

Two methods of applying a fluid material to a roofing surface were conducted to compare (i) the time needed to apply the fluid material to the roofing surface and (ii) the amount of area covered on the roofing surface. The first method of applying the fluid material to the roofing surface used a traditional, canister sprayer with a pressurized tank. The second method of applying the fluid material having a viscosity of 15,000 centipoise (cps) at 25° C. to the roofing surface used a spray application system with a peristaltic pump, a spray gun, and an elliptical spray tip according to an embodiment of the invention, as detailed herein. The results of this comparison study are given in Table 1 below.

TABLE 1

| Application Method | Time Used (min) | Size of Area Covered (SQ) | Minutes/ SQ | Installation Speed Compared to Canister |
|---|---|---|---|---|
| Canister Sprayer with a Pressurized Tank | 101 | 28 SQ | 3.62 | 1 |
| Spray Application System with a Peristaltic Pump, a Spray Gun, and an Elliptical Spray Tip According to an Embodiment of the Present Invention | 32 | 28 SQ | 1.1 | 3.3 × faster |

TABLE 1-continued

| Application Method | Time Used (min) | Size of Area Covered (SQ) | Minutes/SQ | Installation Speed Compared to Canister |
|---|---|---|---|---|
| Canister Sprayer with a Pressurized Tank | 154 | 33 SQ | 4.6 | 1 |
| Spray Application System with a Peristaltic Pump, a Spray Gun, and an Elliptical Spray Tip According to an Embodiment of the Present Invention | 4 | 13 SQ | 0.31 | 15 × faster |
| Canister Sprayer with a Pressurized Tank | 45 | 16 SQ | 2.81 | 1 |
| Spray Application System with a Peristaltic Pump, a Spray Gun, and an Elliptical Spray Tip According to an Embodiment of the Present Invention | 18 | 16 SQ | 1.12 | 2.5 × faster |
| Spray Application System with a Peristaltic Pump, a Spray Gun, and an Elliptical Spray Tip According to an Embodiment of the Present Invention | 9 | 16 SQ | 0.56 | 5.0 × faster |

Although the invention has been described in certain specific exemplary embodiments, many additional modifications and variations would be apparent to those skilled in the art in light of this disclosure. It is, therefore, to be understood that this invention may be practiced otherwise than as specifically described. Thus, the exemplary embodiments of the invention should be considered in all respects to be illustrative and not restrictive, and the scope of the invention to be determined by any claims supportable by this application and the equivalents thereof, rather than by the foregoing description.

We claim:

1. A spray application system comprising:

(a) a movable cart;

(b) a container configured to hold a fluid material, the container being positioned on the movable cart;

(c) a compressor configured (i) to deliver compressed air to the spray application system and (ii) to provide power to pump the fluid material through the spray application system via a peristaltic pump disposed within the compressor and configured to pump the fluid material, the compressor being positioned on the movable cart;

(d) at least two spray nozzles that are each connected to the peristaltic pump via a hose, with each of the spray nozzles being configured to spray the fluid material onto a roofing surface; and (e) an elliptical tip attached to each of the at least two spray nozzles, with each elliptical tip being configured to provide a spray pattern of the fluid material onto a roofing surface, wherein the spray application system is configured to spray the fluid material at a flow rate of 0.5 to 10 gallons per minute, with the fluid material having a viscosity of 10,000 to 40,000 centipoise at 25° C.

2. The spray application system according to claim 1, wherein the fluid material comprises an adhesive solution.

3. The spray application system according to claim 1, wherein the spray pattern comprises a fan pattern.

4. The spray application system according to claim 1, wherein the container includes one of (i) a pouch configured to store the fluid material and (ii) a pouch-in-a-box system configured to store the fluid material.

5. The spray application system according to claim 1, wherein the movable cart includes at least four wheels that are configured to stabilize and to move the spray application system when spraying the fluid material onto a roofing surface.

6. The spray application system according to claim 1, wherein the container is 5 gallons to 25 gallons.

7. The spray application system according to claim 1, further comprising a hose configured to deliver the fluid material from the container to the at least two spray nozzles.

8. The spray application system according to claim 1, further comprising an air tube configured to deliver compressed air from the compressor to the at least two spray nozzles.

9. The spray application system according to claim 1, wherein the peristaltic pump includes (i) a flexible tube configured to deliver the fluid material from the container and to the at least two spray nozzles, (ii) a pump casing that houses the flexible tube, and (iii) a rotating roller, the flexible tube being disposed around the rotating roller.

* * * * *